US008625483B2

(12) United States Patent
Schuringa et al.

(10) Patent No.: US 8,625,483 B2
(45) Date of Patent: Jan. 7, 2014

(54) CONNECTION BASED LOCAL IP-MOBILITY (75) Inventors: Jon Schuringa, Langen (DE); Genadi Velev, Langen (DE); Rolf Hakenberg, Langen (DE)

(73) Assignee: Panasonic Corporation, Osaka (JP)

( * ) Notice: Subject to any disclaimer, the term of this patent is extended or adjusted under 35 U.S.C. 154(b) by 671 days.

(21) Appl. No.: 12/294,663

(22) PCT Filed: Mar. 12, 2007

(86) PCT No.: PCT/EP2007/002162
§ 371 (c)(1),
(2), (4) Date: Nov. 19, 2008

(87) PCT Pub. No.: WO2007/115629
PCT Pub. Date: Oct. 18, 2007

(65) Prior Publication Data
US 2010/0097983 A1    Apr. 22, 2010

(30) Foreign Application Priority Data
Apr. 12, 2006 (EP) .................................. 06007736

(51) Int. Cl.
*H04W 4/00* (2009.01)
(52) U.S. Cl.
USPC .......................................... 370/328; 370/310
(58) Field of Classification Search
None
See application file for complete search history.

(56) References Cited

U.S. PATENT DOCUMENTS

| 2001/0046223 | A1* | 11/2001 | Malki et al. .................... 370/338 |
| 2003/0223395 | A1 | 12/2003 | Chitrapu |
| 2004/0077341 | A1 | 4/2004 | Chandranmenon |
| 2004/0105408 | A1 | 6/2004 | Suh |
| 2005/0111377 | A1* | 5/2005 | Lioy et al. ...................... 370/252 |
| 2005/0128969 | A1* | 6/2005 | Lee et al. ........................ 370/313 |
| 2005/0286471 | A1* | 12/2005 | Yang et al. ...................... 370/331 |
| 2006/0018296 | A1* | 1/2006 | Muraoka et al. ............... 370/338 |
| 2007/0109997 | A1* | 5/2007 | Hong et al. ..................... 370/331 |

FOREIGN PATENT DOCUMENTS

| EP | 1 589 718 | 10/2005 |
| JP | 2005-533458 | 11/2005 |

OTHER PUBLICATIONS

T. Narten and R. Draves, "Privacy Extensions for Stateless Address Autoconfiguration in IPv6, RFC 3041," Jan. 2001, The Internet Society.*

T. T Narten and R. Draves, "Privacy Extensions for Stateless Address Autoconfiguration in IPv6, RFC 3041," Jan. 2001, The Internet Society.*

(Continued)

*Primary Examiner* — Jae Y Lee
(74) *Attorney, Agent, or Firm* — Dickinson Wright PLLC (57) ABSTRACT The invention relates to a method for packet switched data transmission in a local network, the local network comprising a mobile node and a plurality of interconnected connection anchor points each with a link at which the mobile node can attach. The method comprises the steps of detecting a movement of the mobile node from a first connection anchor point to a second connection anchor point, the mobile node communicating via a tunneled connection between the first and second connection anchor point, maintaining the existing tunneled connections between the second connection anchor point and the first connection anchor point, and enabling new connections between the mobile node and correspondent nodes using addresses that are topologically correct.

15 Claims, 5 Drawing Sheets

(56) References Cited

OTHER PUBLICATIONS

Hong et al., "Fast Handover for Mobile IPv6 using Access Router Based Movement Detection and CoA configuration", 2004, IEEE.*
Narten et al., RFC 3041, "Privacy Extensions for Stateless Address Autoconfiguration in IPv6", Jan. 2001, Internet Society.*
International Search Report dated May 2, 2007.
Y. Chen et al., "Dynamic home agent reassignment in mobile IP," Wireless Communications and Networking Conference, 2002. WCNC2002. 2002 IEEE, Piscataway, NJ, USA, IEEE, Mar. 17, 2002, pp. 44-48.
Japanese Office Action dated Mar. 2, 2012 with English translation.
G. Giaretta, et al., "Network-based localized mobility management (NETLMM) with distributed anchor routers," <draft-giaretta-netlmm-protocol-00.txt>, Internet Draft, Oct. 14, 2005, pp. 1-39.

* cited by examiner

Fig. 3  Standard IPv6 Address States as described in RFC 2462

Fig. 4  Controlling the address lifetimes by sending router advertisements RA_MSG1 and RA_MSG2

CONNECTION BASED LOCAL IP-MOBILITY

BACKGROUND OF THE INVENTION

1. Field of the Invention

The invention is related to mobile communications systems. More specifically it relates to local IP mobility from mobile communications on the internet protocol (IPv6) or similar protocols.

2. Description of the Related Art

The invention is described for the example of the Internet Protocol version 6 (IPv6). It is, however, also applicable to other protocols defining equivalent entities corresponding to the described entities of IPv6.

When an IPv6 mobile node (MN) moves from a serving access router (AR) to another AR on a different IP link, the mobile node needs to configure new IP address(es) based on the IP prefix(es) advertised by the new AR. The change of the serving AR means that a new IP connectivity has to be re-established, and therefore that active IP sessions will be lost.

One approach to keep the existing active IP sessions alive is the Mobile IPv6 (MIPv6) protocol, RFC3775 (D. Johnson, C. Perkins, J. Arkko, "Mobility Support in IPv6", RFC3775, June 2004).

In MIPv6, each MN has configured a home IP address (HoA), which is used to identify itself independently of its topological location in the Internet. The MN also configures a care-of-address (CoA), which is topologically related to the actual location of the MN. Whenever a MN performs a handover, a new CoA is configured and announced to the home agent (HA), which tunnels the packets to the MN.

Another approach to keep the existing active IP sessions alive is to configure a local set of ARs to advertise the same set of IP prefixes, so that the MN can keep using the IP addresses that have been configured at the old AR. This approach is called network-based localized mobility management (NetLMM, a description of the NetLMM framework can be found at: http://www.ieff.org/html.charters/netlmm-charter.html), since the MN is not actively involved in mobility management functions.

In contrast to NetLMM, MIPv6 can be categorized as host-based mobility management. Detailed information about the problems with existing host-based mobility management can be found in J. Kempf et. al. ("Problem Statement for IP Local Mobility", draft-kempf-netlmm-nohost-ps-00.txt, June 2005), it also describes an architecture for a possible localized mobility management approach.

Figure 1:
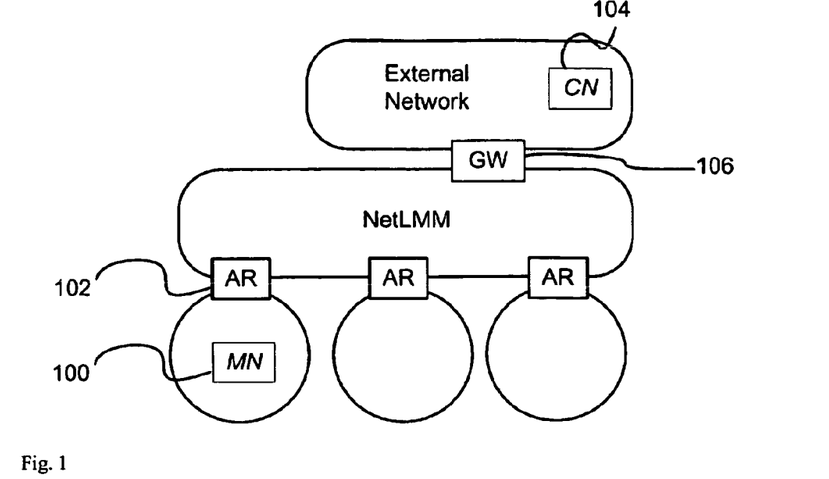
FIG. 1 shows the prior art reference architecture as proposed by Giaretta.

The NetLMM protocol proposed by Giaretta et al. (G. Giaretta et al., "Network-based localized mobility management (NETLMM) with distributed anchor routers", draft-giaretta-netlmm-protocol-00.txt), 2005 can be used to handle IP mobility within a localized mobility management domain. The edge of a domain is made up of Access Routers (ARs) and Border Gateways (BGs) 106, as illustrated in FIG. 1. An AR 102 can manage one or more IP links (i.e. layer 2 access networks), each one univocally associated with at least an IPv6 prefix. It represents the first IP router encountered by the mobile node 100 on the way to the destination. The BGs 106 are used to interconnect the domain with external networks, like the Internet. There are no constraints on the internal topology of a domain. As long as the mobile node 100 remains within the same domain, it can keep on using the same IP address even if it happens to change the AR it is attached to.

The AR 102 on the link where an MN powers on will be the Home Access Router (HAR) for that MN 100. The IP address of the MN 100 will be based on the prefix advertised by its HAR 102. As long as the MN 100 is on the same link as its HAR 102, packets can be normally routed (i.e. no tunnelling) to and from the MN 100, since the MN's IP address is topologically correct.

If an MN moves away from its HAR, it can keep using the same IP address, despite the fact that that address is now topologically incorrect. To allow this IP tunnelling is used to direct packets between the HAR and the Visiting AR (VAR).

The problem with the previously described prior art is that tunnels are needed if the MN moves away from its HAR (this is the AR where the MN powers on). Tunnels are inefficient for a number of reasons:

Workload increase at the tunnel endpoints: Each packet through the tunnel needs to be encapsulated and decapsulated, and this requires processing at the endpoints.

Increased Bandwidth Consumption: Because of the extra header needed for tunnelling, 40 additional bytes are needed for each packet (when using IPv6). For small packets like voice packets, this is a very high overhead.

Increased packet end-to-end delay: This is a direct result of the two reasons explained above.

Due to these drawbacks of tunnels, the goal of this invention is to avoid or limit the use of tunnels, while maintaining all functionalities of the prior art.

"Always on" devices can be particularly disadvantageous when used in Giaretta's NetLMM, namely if that device powers on at a place where it normally does not reside, it may occur that that device will always need a tunnel for the rest of its on period.

SUMMARY OF THE INVENTION

The object of the invention is to provide increased efficiency of communications in local IP mobility.

The object is solved by the subject matter of the independent claims. Advantageous embodiments of the invention are subject matters to the dependent claims.

To achieve this object, the present invention provides a method, mobile node, connection anchor point, system and computer readable medium for packet switched data transmission in a local network, the local network comprising a mobile node and a plurality of interconnected connection anchor points each with a link at which the mobile node can attach. A movement of the mobile node from a first connection anchor point to a second connection anchor point is detected, the mobile node communicating via a tunnelled connection between the first and second connection anchor point. The existing tunnelled connections between the second connection anchor point and the first connection anchor point are maintained, and new connections between the mobile node and correspondent nodes are enabled using addresses that are topologically correct.

According to an advantageous embodiment the step of enabling new connections comprises broadcasting a router solicitation message by the mobile node, responding to the router solicitation message by the second connection anchor point, and checking for duplicate addresses for each of a plurality of addresses of the mobile node.

In a further embodiment of this invention the step of responding to the router solicitation message comprises sending by the second connection anchor point a first message to the mobile node for each of the plurality of addresses of the mobile node.

An advantageous aspect of the invention is that the first message is a router advertisement.

According to another advantageous embodiment the method further comprises the steps of detecting a movement of the mobile node from the second connection anchor point to a third connection anchor point, changing existing tunnelled connections via the second connection anchor point to the third connection anchor point, and setting up a new tunnelled connection from the second connection anchor point to the third connection anchor point.

In another embodiment of the invention each of the plurality of addresses of the mobile node is tentative or preferred or deprecated or invalid.

In a further embodiment of the invention the first message comprises a preferred and valid lifetime of the address of the mobile node and wherein an advertised prefix equals that of the first connection anchor point According to another advantageous embodiment of the invention the preferred lifetime of the address is zero.

In a further advantageous embodiment the method further comprises the step of calculating a valid lifetime from a projected address expiration time stored at the first connection anchor point.

According to another advantageous embodiment the method further comprises the step of sending a second message to refresh a valid lifetime of a deprecated address in use by the mobile node.

Another advantageous embodiment has inactive connections being removed.

In a further advantageous embodiment the second message is sent before the valid lifetime expires.

According to a further embodiment the method further comprises the step of starting a timer in the first connection anchor point when the mobile node moves to the second connection anchor point, in order to keep track of the valid lifetime of the address of the mobile node.

In another advantageous embodiment the timer is started after the first message is sent.

Another advantageous embodiment comprises the step of monitoring a usage of the existing tunnelled connection for the transmission of packets and setting an indicator accordingly.

In a further embodiment of the invention the method further comprises the following steps when the indicator indicates activity: sending by the first connection anchor point a message to the second connection anchor point with a pre-configured valid lifetime, sending by the second connection anchor point a router advertisement message to the mobile node, setting the indicator to indicate no activity and re-initialising the timer.

According to another advantageous embodiment of the invention the existing tunnelled connection is removed when the indicator indicates no activity.

Another advantageous embodiment of the invention relates to a mobile node in a local network using packet switched data transmission, the local network comprising the mobile node and a plurality of interconnected connection anchor points each with a link at which the mobile node can attach, the mobile node comprising transmission means adapted to broadcast a router solicitation message.

A further advantageous embodiment of the invention relates to a connection anchor point in a local network using packet switched data transmission, the local network comprising a mobile node and a plurality of interconnected connection anchor points each with a link at which the mobile node can attach, the connection anchor point comprising detection means adapted to detect a movement of the mobile node from the connection anchor point to a second connection anchor point, the mobile node communicating via a tunnelled connection between the first and second connection anchor point, connection means adapted to maintain the existing tunnelled connections between the second connection anchor point and the connection anchor point, and connection means adapted to enable new connections between the mobile node and correspondent nodes using addresses that are topologically correct.

A further advantageous embodiment relates to a communication system for packet switched data transmission in a local network, the local network comprising a mobile node and a plurality of interconnected connection anchor points.

A further embodiment of the invention relates to a computer readable medium storing instructions that, when executed by a processor in a mobile node in a local network using packet switched data transmission, the local network comprising the mobile node and a plurality of interconnected connection anchor points each with a link at which the mobile node can attach, cause the mobile node to broadcast a router solicitation message.

Another advantageous embodiment of the invention relates to a computer readable medium storing instructions that, when executed by a processor in a connection anchor point in a local network using packet switched data transmission, the local network comprising a mobile node and a plurality of interconnected connection anchor points each with a link at which the mobile node can attach, cause the connection anchor point to detect a movement of the mobile node from the connection anchor point to a second connection anchor point, the mobile node communicating via a tunnelled connection between the first and second connection anchor point, maintain the existing tunnelled connections between the second connection anchor point and the connection anchor point, and enable new connections between the mobile node and correspondent nodes using addresses that are topologically correct.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers. The following paragraphs will describe various embodiments of the invention. For exemplary purposes only, most of the embodiments are outlined in relation to a MIPv6 communication system and the terminology used in the subsequent sections mainly relates to the MIPv6 terminology. However, the used terminology and the description of the embodiments with respect to a MIPv6 architecture is not intended to limit the principles and ideas of the inventions to such systems.

Also the detailed explanations given in the Technical Background section above are merely intended to better understand the mostly MIPv6 specific exemplary embodiments described in the following and should not be understood as limiting the invention to the described specific implementations of processes and functions in the packet switched communication network.

Notes:
The meaning of "connection" as used in this report: Any IP activity like a TCP connection, or an UDP stream between the MN and a CN.
Connection Anchor Points (CAPs), which are introduced in this invention also have the functionality of ARs (like in NetLMM), in the sense that they send periodic router advertisements and can therefore be detected and used as default routers by the MNs.
This text makes use of Home CAPs (HCAP) and Visited CAPs (VCAP). Strictly speaking however, a connection is only anchored at its HCAP; the connection is never anchored at a VCAP. But, a VCAP for one connection may be the HCAP for another connection.

This invention allows mobile nodes to keep their IP-address, and therefore their existing connections, while moving between IP links in a local domain. The difference to existing systems network based local mobility management (NetLMM) that provide such behaviour is that the MN (Mobile Node) always uses a topologically correct IP address for new connections, even after moving to a new IP-link. Thus, multiple IP addresses may be in use by the mobile node at the same time, and there is always a topologically correct address to use for new connections. The main benefit is increased efficiency, because tunnelling of packets can be avoided in many cases. This invention primarily deals with controlling the preferred, deprecated and valid address states of the mobile nodes to provide the desired behaviour.

To accomplish this behaviour, this invention mainly deals with network-controlled management of the MN IPv6 address states (tentative, preferred, deprecated and invalid).

In Giaretta's proposal, the need for tunnelling comes up from the fact that addresses become topologically incorrect when MNs 100 are away from their Home AR 200. All communication is then tunnelled through to the HAR 200 of the MN (see, for example, FIG. 2). The main idea of this invention is that only existing communication sessions use a tunnel after a handover, and newly initiated communication sessions use the topologically correct IP address. This typically requires multiple IP addresses at the MN at the same time.

FIG. 1 illustrates the architecture of the NetLMM proposal by Giaretta. The important point here is that each AR 102 advertises its own topologically correct prefix, and therefore no tunnels are needed for communication to and from MNs 100 that are at their home AR. To be consistent with the draft G. Giaretta et al. ("Network-based localized mobility management (NETLMM) with distributed anchor routers", draft-giaretta-netlmm-protocol-00.txt, 2005), this figure shows the gateway 106, but the gateway is actually irrelevant to this invention, and will therefore not be shown in the remaining figures.

Figure 2:
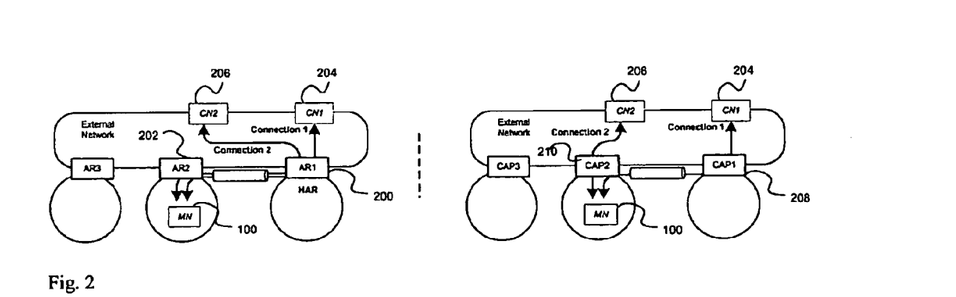
FIG. 2 illustrates the main benefit of the invention. In the figure, the MN powered on at the IP-link served by AR1 (CAP1), starts a connection and moves to a new IP-link. The MN now starts another connection. In the prior art case, the new connection needs to make use of the tunnel, while in this invention it does not.

The difference in behaviour of this invention compared to prior art is illustrated in FIG. 2. It is assumed that the MN 100 powered on at the IP link served by AR1 200 (CAP1 208). The MN starts a connection and moves to AR2 202. There, a second connection is initiated. For generality, the second connection uses a different corresponding node 206, but it would work equally well with only one corresponding node 204. In Giaretta's case, the second connection uses the tunnel and longer path through the Home AR 200 of the MN 100. This invention uses the topologically correct address for this connection and therefore does not need a tunnel.

When Connection 1 finishes, then Giaretta's proposal still uses a tunnel, in contrast to this invention, where no tunnel is needed anymore.

Figure 3:
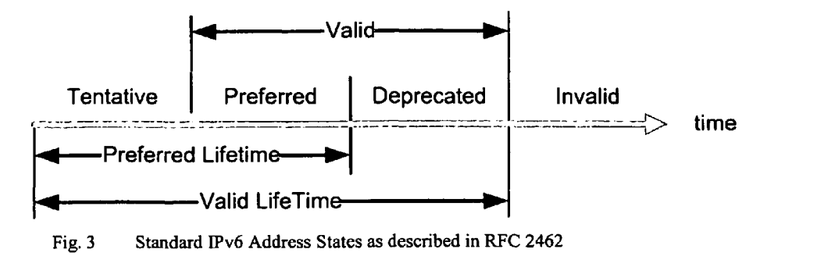
FIG. 3 illustrates the four possible IPv6 address states as described in RFC 2462 (S. Thomson, T. Narten, "IPv6 Stateless Address Autoconfiguration", RFC 2462, December 1998)

FIG. 3 shows the different states of an IPv6 address as explained in RFC2462. Since the use of especially the deprecated state is crucial to this invention, special attention will be given here.

Any newly created IP address must be checked for uniqueness. Until that check is completed, the address is in the "tentative" state. If that check is successful, the next state will normally be the preferred state. This depends on the values of the timers in the router advertisements. The address will become invalid if the preferred lifetime expires.

The deprecated state is explained in RFC 2462: "While in a deprecated state, the use of an address is discouraged, but not strictly forbidden. New communication (e.g., the opening of a new TCP connection) should use a preferred address when possible. A deprecated address should be used only by applications that have been using it and would have difficulty switching to another address without a service disruption."

Figure 4:
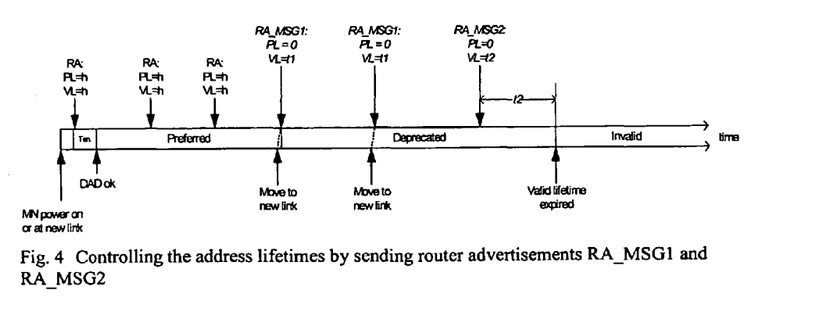
FIG. 4 shows how events like handover and router advertisements influence the states of a single IPv6 address. The main point is to control the preferred and valid lifetimes for that address at the MN in the desired way.
Figure 5:
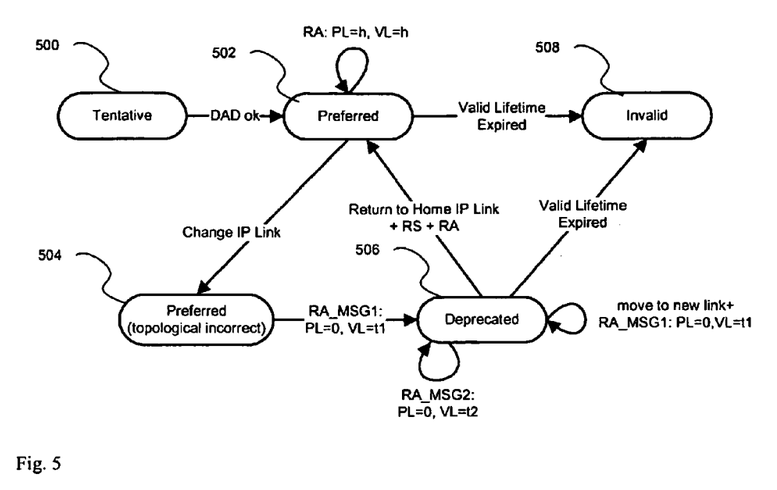
FIG. 5 shows the lifecycle of an address in this invention in a more general way than in FIG. 4.

FIG. 4 and FIG. 5 show the life cycle of a MN IP-address as used in this invention. It is important to note that the MN will have more than one valid address. Note that valid addresses include the preferred as well as the deprecated addresses. The figures only show the life cycle of one address.

Two messages with special functionality are used in this invention; these are labelled MSG1 and MSG2. Both messages are sent over two hops, but do not have the same packet format at those hops; they therefore have a sub-label a and b (e.g. MSG1a), denoting the message at the corresponding hop.

New IP address initiation: When a MN powers up, or enters a new IP-link, it will receive router advertisements on that link. Since these advertisements have the 'A'-bit set, they will be used by the MN to auto-configure the first or an additional IP-address based on the received prefix. Furthermore, these advertisements contain a valid and a preferred lifetime h, which is a preconfigured constant (e.g., 2 hours). After performing duplicate address detection (DAD), the address moves from tentative to the preferred state, if no duplicates were found.

Subsequent advertisement while on the initial link: The preferred and valid lifetimes of the address are updated when receiving unsolicited router advertisements. This is the normal IPv6 procedure.

Link Change

After a link change, but before this is detected by the MN and VCAP, the address is still in the preferred state, but is now topologically incorrect, as illustrated in FIGS. 4 and 5. Note that the residual time in this state should be kept as small as possible.

Figure 6:
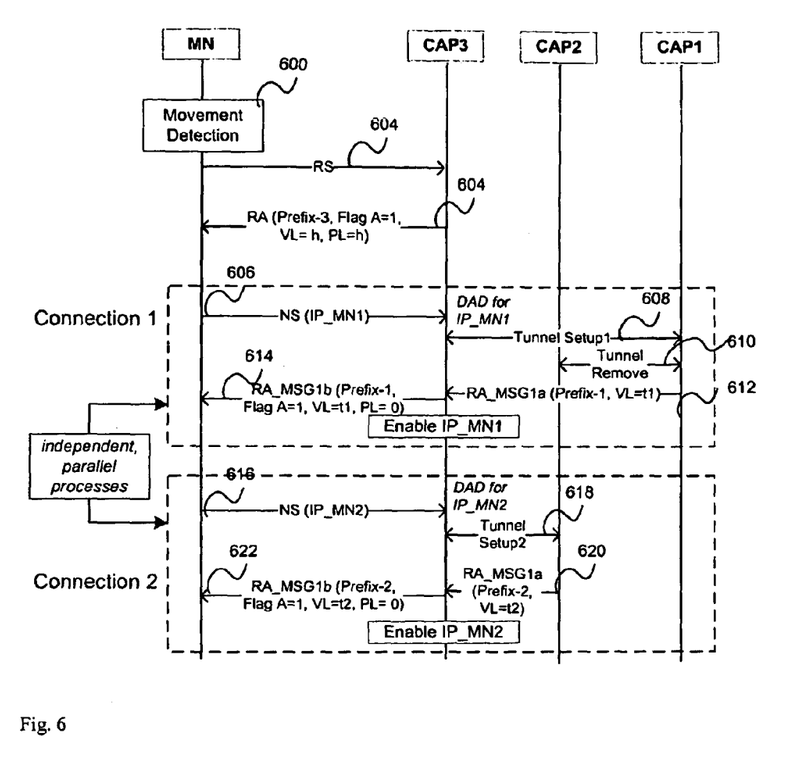
FIG. 6 displays the message exchange between the network entities for a MN that moves to a new IP-link and has two active connections anchored at two CAPs.

The MN movement will quickly be detected by the new CAP, since the MN signals after a layer-2 movement that it is willing to keep its current IP-addresses (details are explained in the description of FIG. 6). This new CAP sends an unsolicited unicast RA (Router Advertisement) to the MN, containing a Preferred Lifetime of zero (MSG1). This is done for each IP-address the MN is willing to keep. The result is that the IP address will become, or remain, deprecated. Thus, this address will not be used for new connections, it should be noted that after the link change, the MN configures a new IP address next to all addresses it already uses. FIG. 4 and FIG. 5 however, concentrate on keeping the current addresses valid, but is still valid for existing connections.

The second timer value to be set in the RA is the Valid Lifetime (VL). The value for this is calculated (t1), depending on the projected address expiration time stored at the HCAP. As will be shown later, the reason for this is that an address should expire when it is not being used anymore. If a constant value (e.g. t1=1 hour) were to be advertised, and the MN makes one or more link changes within each hour, the valid lifetime would never expire, which is clearly unwanted.

Valid Lifetime Updating while Away from Initial Link

The IP address must remain in deprecated state as least as long as the MN has active connections using this address. In other words, the valid lifetime of the address may not reach zero in that case.

The RA-Refresh message (MSG2) is introduced for this purpose. This router advertisement has a preferred lifetime of zero and a valid lifetime t2, which is a preconfigured constant value greater than zero. It must be sent before that valid lifetime expires but only if the MN has active connections. See the description of FIG. 7 for details.

If no RA-Refresh messages are sent to the MN, the address state of the MN will move from deprecated to invalid when the valid lifetime timer expires for that address. This should be the case for addresses that are not in use anymore by the MN. The details to perform this are explained in the description of FIG. 7.

FIG. 6 shows the steps performed by a MN and the CAPs when the MN moves to a new IP link. The MN is moving with two active connections: the initial situation is as illustrated on the right-hand side in FIG. 2. The MN is now moving to CAP3.

A description of the events/messages in FIG. 6 (the first three points are normal IPv6 behaviour, and are also used by Giaretta):

The MN detects 600 movements as described in the prior art, or any other method (e.g. using layer 2 hints/events).

After detection, the MN sends 602 a router solicitation (RS) to the all routers multicast address.

The CAP on the new link (CAP3) responds 604 to the router solicitation with the topological correct prefix on that link, the 'A'-bit set and a valid lifetime greater than zero. The MN uses this advertisement to create an additional IP address using stateless auto-configuration (details of this are not shown in the figure).

The MN signals that it is willing to keep its previous addresses by performing a DAD check for them. It does this for all of its valid addresses. Note that in Giaretta's case this is only done for one address. In the example shown in the figure the MN has two addresses and these are processed sequentially for clarity, but it is favourable to process them in parallel.

The visited CAP on the new link (CAP3) detects the DAD for all global IP addresses of the MN. Based on a table at each CAP, the visited CAP can determine the Home CAP address for each IP address of the MN. The foreign CAP then initiates the tunnel setup 608, 616, as explained in FIG. 7.

After the tunnel setup, an unsolicited unicast router advertisement is sent 614, 622 to the MN, with a preferred lifetime of 0. Upon reception of this message, the corresponding IP address will become deprecated, but is still valid.

The final result of this handover procedure is that the MN now has a new, topologically correct, preferred address, and the addresses in use by both connections are now deprecated. The deprecated addresses can still be used, but require tunnelling via their respective HCAPs.

Figure 7:
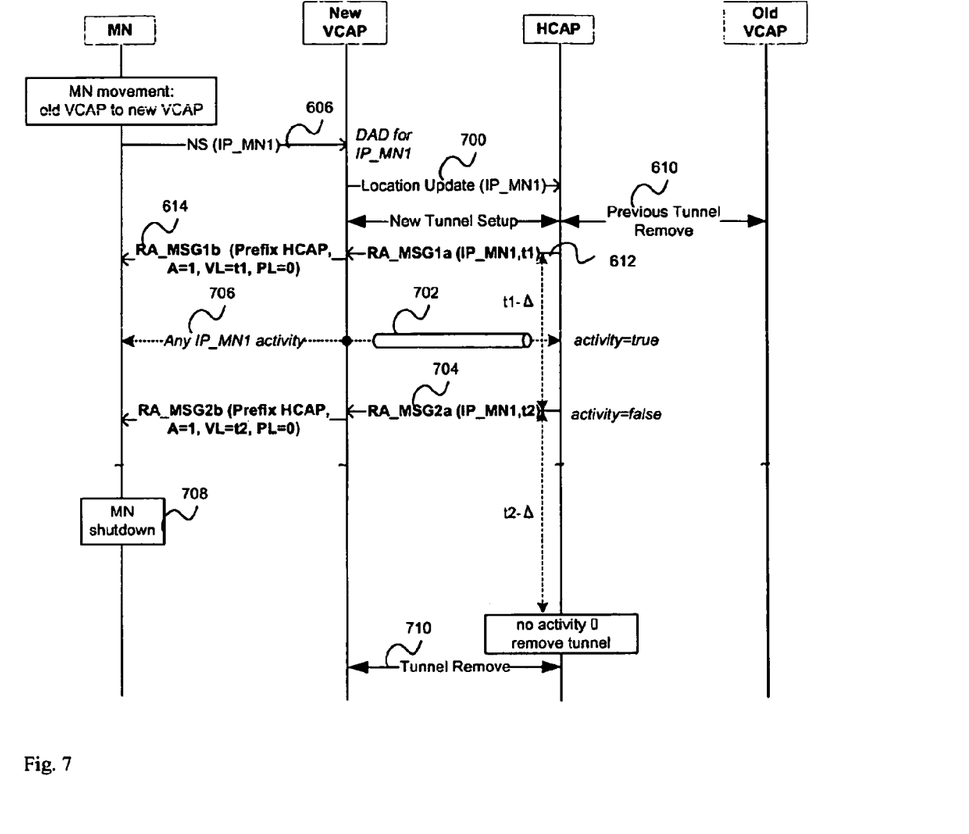
FIG. 7 shows the RA-Refresh related messages and timers. The goal is to refresh the valid lifetime for active IP addresses at a visited CAP.

FIG. 7 describes RA-Refresh (RA_MSG2). The RA-refresh related messages and actions are needed to refresh the valid lifetime of a deprecated IP address in use by a MN. The main point of this message is that the valid lifetime should be renewed when the address is still in use by the MN, but should expire when it is inactive. Since MNs may move with their IP address, some additional effort must take place to get the desired result.

In FIG. 7, it is assumed that the MN performs a second movement, from an old VCAP to a new VCAP. The first action in the figure is the movement of the MN, in this case with only 1 active IP address: IP_MN1. Once the MN detects its movement, it is signalling that it is willing to keep its IP address by performing a DAD check for it. Since IP_MN1 is not known at the new VCAP at that moment, this VCAP also detects the movement and informs the HCAP (the address of HCAP can be found based on IP_MN1 and a preconfigured mapping of prefixes to HCAP addresses) with a location update 700 for (IP_MN1). A new tunnel is then set up between HCAP and new VCAP 608, to route packets to and from the MN. The old tunnel is removed 610 since it is not valid anymore. The tunnel setup and removal itself is performed as in the prior art.

The HCAP keeps track of the valid lifetimes of all the addresses that it manages. For each address that leaves its HCAP, a timer is started at the HCAP. The timeout should occur before the valid lifetime of the MN's address expires.

That timer is started after the RA_MSG1$a$ is sent (see FIG. 7). As explained in FIG. 4, this message triggers RA_MSG1$b$ and the latter sets the address state to deprecated at the MN. The goal of the timer is to trigger a RA to prevent that an active address becomes invalid. The timer is set to t1-Δ, where t1 denotes the projected time until address lifetime expiration, and Δ needs to be chosen to take the time into account that is needed for the message to arrive at the MN. Since RA's are not acknowledged, this message can be sent multiple times, to improve the probability of successful reception.

Since active addresses must be kept alive, the HCAP monitors the use of the tunnel for each address to see whether or not packets have been transmitted to or from this address. Whenever this is the case, an activity flag for this address is set to true at the HCAP.

Now, if the timer expires, that flag is inspected and based on its value, one of the following actions occur.

Activity=true

The HCAP sends 704 a RA_MSG2$a$ message with the preconfigured time value t2 to the current VCAP of the MN. The VCAP creates a standard conform RA (RA_MSG2$b$) and sends 706 it to the MN. This message acts as a valid lifetime refresh message. The activity flag is reset to false after the HCAP sends the message. Furthermore, the timer is reinitialized to t2-Δ.

Activity=false

No packets have been received nor transmitted to or from the address for the last t2 period, therefore this address is considered to be not in use anymore, and all state information and the tunnel will be removed 710. The timer is not restarted.

In this way, unused addresses will eventually be deleted from the system.

When the local domain is relatively small, in terms of the number of used IP-links, a variant of this invention is where all router advertisements are preconfigured and are multicast to all nodes (Static Router Advertisement). The advantage is that the system can be simplified to a great extent, since no MN-related status information needs to be stored at the HCAP. Consequently, no actions specific for a MN (RA_MSG1 and RA_MSG2) needs to take place. The disadvantage is that all MNs configure IP-addresses for all prefixes that they receive, and these will remain valid as long as they are in the local domain and receive the router advertisements.

Because of the aforementioned disadvantage, this variant would only make sense in relatively, in terms of number of IP-links, small local domains.

This invention uses one or more CAPs per IP-link. This allows address movements between IP-links. Now, by replacing an IP-link by a complete NetLMM domain, this invention could be used to allow MNs to move between different NetLMM domains while keep using their IP addresses. Each domain would have at least one CAP, and this allows MNs to move between different domains while keeping their IP addresses. This would then be an Inter NetLMM Domain handover.

The following changes to the Mobile Node are necessary for the invention to be carried out. Like in Giaretta's draft, the impacts on the MN are minimal and are limited to slight modifications in the way IP addresses are renewed across mobility events. After a link change, it must be possible for the MN to request the continued use of all the IP addresses it used on previously visited links.

One possibility, as described above, is that the MN sends a Neighbor Solicitation (NS) as part of the Duplicate Address Detection (DAD) procedure for each if its addresses (see FIG. 6). In principle, any message that contains the MN's IP-address and is received by the CAP can be used as a trigger that indicates the MN is asking the activation of a specific address.

The following changes are necessary to an Access Router to make it a Connection Anchor Point.

In case of the Home CAP function:
Process "Location updates" for a MN's IP-address:
Store the current location (which VCAP) of that address
Setup a tunnel to the Visited CAP
Two possibilities here: A separate tunnel for each MN, or multiple MN's using the same tunnel between 1 HCAP and 1 VCAP
If a previous tunnel exists for that MN-address, remove it
Send the router advertisement message with correct values for prefix, valid and preferred lifetime, to the VCAP.
Start the timer with the timeout value based on the projected preferred lifetime.
Set activity flag to "false".
Monitor tunnel activity for each MN-Address
Upon detection: set activity to "true".
Action Performed at Timer Timeout:
Case 1: Activity flag="false"
Remove the tunnel to the current VCAP of the address in question.
Case 2: Activity flag="true"
Send a router refresh
In case of the Visited CAP function:
Detect the movement of a MN and the addresses it uses
Upon movement detection, send a location update for each detected MN-address to the corresponding Home CAP.
Forward packets arriving at a tunnel to the MN at the VCAP's link
Receive and forward the first and second (router advertisement) message, thereby reformatting the packet to a standard format that is understood by the MN.
Correctly respond and take actions to "tunnel remove and setup" messages originating from the HCAP.

Another embodiment of the invention relates to the implementation of the above described various embodiments using hardware and software. It is recognized that the various above mentioned methods may be implemented or performed using computing devices (processors), as for example general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

Abbreviations
AR—Access Router
BG—Border Gateway
CAP—Connection Anchor Point
CN—Corresponding Node
DAD—Duplicate Address Detection
HA—Home Agent
HAR—Home Access Router
HCAP—Home Connection Anchor Point
HO—Handover
HoA—Home Address
MIPv6—Mobile IPv6
MN—Mobile Node
NetLMM—Network-based Localized Mobility Management
NS—Neighbour Solicitation
PL—Preferred Lifetime
RA—Router Advertisement
RS—Router Solicitation
TCP—Transport Control Protocol
UDP—User Datagram Protocol
VAR—Visited Access Router
VCAP—Visited Connection Anchor Point
VL—Valid Lifetime

The invention claimed is:

1. A method for packet switched data transmission in a local network, the local network comprising a mobile node and a plurality of interconnected connection anchor points, each with a link at which the mobile node can attach, the method comprising the steps of:
   detecting by a second connection anchor point a movement of the mobile node from a first connection anchor point to the second connection anchor point, the mobile node having an address configured with an advertised prefix from the first connection anchor point and communicating via a tunneled connection between the first and second connection anchor points;

maintaining the tunneled connection between the second connection anchor point and the first connection anchor point;

receiving by the second connection anchor point a router advertisement including the advertised prefix being sent from the first connection anchor point; and sending by the second connection anchor point a first message to the mobile node, the first message including the advertised prefix from the first connection anchor point, wherein:

the first message is the router advertisement.

2. The method according to claim 1, further comprising the steps of:
  detecting a movement of the mobile node from the second connection anchor point to a third connection anchor point;
  changing existing tunneled connections via the second connection anchor point to the third connection anchor point; and
  setting up a new tunneled connection from the second connection anchor point to the third connection anchor point.

3. The method according to claim 1, wherein the first message comprises a preferred and valid lifetime of the address of the mobile node.

4. The method according to claim 3, wherein the preferred lifetime of the address is zero.

5. The method according to claim 1, further comprising the following step:
  calculating a valid lifetime from a projected address expiration time stored at the first connection anchor point.

6. The method according to claim 1, further comprising the step of:
  sending a second message to refresh a valid lifetime of a deprecated address in use by the mobile node.

7. The method according to claim 6, further comprising the step of:
  removing inactive connections.

8. The method according to claim 6, wherein the second message is sent before the valid lifetime expires.

9. The method according to claim 6, further comprising the step of:
  starting a timer in the first connection anchor point when the mobile node moves to the second connection anchor point, in order to keep track of the valid lifetime of the address of the mobile node.

10. The method according to claim 9, wherein the timer is started after the first message is sent.

11. The method according to claim 9, further comprising the step of:
  monitoring a usage of the tunneled connection for transmission of packets and setting an indicator accordingly.

12. The method according to claim 11, further comprising the following steps when the indicator indicates activity:
  sending by the first connection anchor point a message to the second connection anchor point with a preconfigured valid lifetime;
  sending by the second connection anchor point a router advertisement message to the mobile node;
  setting the indicator to indicate no activity; and
  re-initializing the timer.

13. The method according to claim 11, further comprising the following step when the indicator indicates no activity:
  removing the tunneled connection.

14. A connection anchor point in a local network using packet switched data transmission, the local network comprising a mobile node and a plurality of interconnected connection anchor points, each with a link at which the mobile node can attach, the connection anchor point comprising:
  a detection unit configured to detect a movement of the mobile node from a first connection anchor point to the connection anchor point, the mobile node communicating via a tunneled connection between the first connection anchor point and the connection anchor point;
  a connection unit configured to maintain the tunneled connection between the first connection anchor point and the connection anchor point;
  a receiving unit configured to receive a router advertisement including an advertised prefix from the first connection anchor point; and
  a sending unit configured to send a first message to the mobile node, the first message including the advertised prefix from the first connection anchor point, wherein:
  the first message is a router advertisement.

15. A communication system for packet switched data transmission in a local network, the local network comprising:
  a mobile node in the local network configured to use the packet switched data transmission, and
  a plurality of interconnected connection anchor points according to claim 14.

* * * * *